United States Patent
Whitby et al.

[11] Patent Number: 6,126,841
[45] Date of Patent: Oct. 3, 2000

[54] INCREASING TURBULENT MIXING IN A UV SYSTEM

[75] Inventors: G. Elliott Whitby, Toronto; Mark Richard Loewen, Oakville; Pierluigi Cozzi, Ridgeville, all of Canada

[73] Assignee: Trojan Technologies Inc., Canada

[21] Appl. No.: 09/205,178

[22] Filed: Dec. 4, 1998

Related U.S. Application Data

[63] Continuation of application No. 08/778,913, Jan. 3, 1997, Pat. No. 5,846,437.

[51] Int. Cl.$^7$ ............................................. C02F 1/32
[52] U.S. Cl. ............................................. 210/748; 422/24
[58] Field of Search ............... 210/748; 422/186.3, 422/24; 250/431, 436

[56] References Cited

U.S. PATENT DOCUMENTS

| | | | |
|---|---|---|---|
| 2,189,279 | 2/1940 | Bitner | 204/24 |
| 3,562,520 | 2/1971 | Hippen | 250/43 |
| 4,336,223 | 6/1982 | Hillman | 422/24 |
| 4,342,915 | 8/1982 | Karamian | 250/436 |
| 4,400,270 | 8/1983 | Hillman | 210/748 |
| 4,482,809 | 11/1984 | Maarschalkerweerd | 250/436 |
| 4,757,205 | 7/1988 | Latel et al. | 250/435 |
| 4,857,204 | 8/1989 | Joklik | 210/748 |
| 4,872,980 | 10/1989 | Maarschalkerweerd | 210/243 |
| 5,019,256 | 5/1991 | Ifill et al. | 210/232 |
| 5,266,280 | 11/1993 | Hallett | 422/186.3 |
| 5,332,388 | 7/1994 | Schuerch et al. | 422/291 |
| 5,352,359 | 10/1994 | Nagai et al. | 210/748 |
| 5,683,589 | 11/1997 | De Lasa et al. | 210/748 |
| 5,780,860 | 7/1998 | Gadgil et al. | 250/432 |

FOREIGN PATENT DOCUMENTS

| | | |
|---|---|---|
| 2213658 | 10/1973 | Germany . |
| 63-137793 | 6/1963 | Japan . |
| 55-159778 | 12/1980 | Japan . |
| 59-150589 | 8/1984 | Japan . |
| 63-104696 | 5/1988 | Japan . |
| 1-176490 | 7/1989 | Japan . |
| 1-274894 | 11/1989 | Japan . |
| 2-174989 | 7/1990 | Japan . |
| 2-214589 | 8/1990 | Japan . |
| 6-47593 | 2/1994 | Japan . |
| 8-17935 | 1/1996 | Japan . |
| 1385661 | 2/1975 | United Kingdom . |
| 82/01703 | 5/1982 | WIPO . |
| 94/02680 | 2/1994 | WIPO . |

*Primary Examiner*—David A. Simmons
*Assistant Examiner*—Frank M. Lawrence
*Attorney, Agent, or Firm*—Fitzpatrick, Cella, Harper & Scinto

[57] ABSTRACT

Turbulent mixing in a UV system is increased by positioning one or more ring-shaped devices, such as washers, at one or more predetermined locations on the exterior surface of each lamp unit in the system. The washers may have the same or different diameters. Turbulent mixing is also increased by retaining the upstream end of each lamp unit in a ring-shaped device, alone or in combination with washers positioned on each lamp unit exterior surface as described above.

4 Claims, 5 Drawing Sheets

INCREASING TURBULENT MIXING IN A UV SYSTEM

This is a continuation of application Ser. No. 08/778,913, filed Jan. 3, 1997 now U.S. Pat. No. 5,846,437.

FIELD OF THE INVENTION

This invention relates to systems that use ultraviolet (UV) light to control organisms and more particularly to the dosage of UV radiation that the organism is subjected to in passing through the system.

DESCRIPTION OF THE PRIOR ART

As is well known, UV light may be used to disinfect water including wastewater. The UV light inhibits the replication of any pathogenic microorganisms in the water or wastewater. Recently, UV light has been proposed for controlling zebra and related mussels present in the lake and river water used by power plants.

The key to using UV light to control an organism, be it a microorganism or mussel, is that the organism receive an adequate dose of UV light so that it will be unable to survive. The dose of radiation received by an organism is defined by:

$$\text{Dose} = \text{Intensity} \times \text{Time}.$$

wherein Time is the time of exposure of a given organism to the UV light in seconds, Intensity is measured in $W/cm^2$, and Dose is measured in $W \cdot sec/cm^2$. For a given UV lamp power output, the intensity will diminish with increasing radial distance from the lamp.

One example of using UV light to control an organism is the wastewater disinfection system described in U.S. Pat. No. 5,019,256 ("the '256 Patent") which issued on May 28, 1991 and is assigned to an assignee who is related to the assignee of the present invention. The system has a frame on which are mounted one or more modular racks. Each rack has an array of two or more lamp units. Each lamp unit consists of a UV lamp surrounded by a quartz sleeve. Each lamp has contacts for connection to a source of electrical power only at one end of the lamp and the quartz sleeve is closed at one end.

The lamp units are assembled so that the closed end of the quartz sleeve is at end of the lamp not having the electrical power connection contacts. Each rack has two opposed legs. One of the legs has two or more swivel sleeves mounted thereon. Each swivel sleeve is associated with a respective one of the lamp units. The limp units are mounted on the rack so that the closed end of the quartz sleeve slides into the swivel sleeve. A portion of the closed end of the quartz sleeve resides in the swivel sleeve.

In a UV system such as that described in the '256 Patent, the intensity is at a minimum at point 2 in FIG. 7C. If an organism remains near the centerline when it passes through the lamp array it will experience a reduced UV dosage as compared to the UV dosage received by an organism that travels an irregular turbulent path through the lamp array. The turbulent pathline will bring the organism closer to the quartz sleeves and therefore closer to the lamps.

Therefore, it is desirable to increase the turbulent mixing already existent in the system as the organism traverses the lamp array. Since the cost of the quartz sleeve is related to its length, it is also desirable to increase the turbulent mixing in the system in a manner that reduces the length of the quartz sleeve. It is further desirable to ensure that there is turbulent mixing throughout the UV system lamp array as the organism traverses the system.

SUMMARY OF THE INVENTION

A method for increasing turbulent mixing in a UV system that is to be immersed in a liquid. The system has at least one lamp unit. The method includes the step of installing a ring-shaped device at a predetermined location on the exterior surface of the lamp unit.

A UV system for immersion in a liquid. The system has at least one lamp unit. The system also has a ring-shaped device located at a first predetermined position on the exterior surface of the lamp unit.

A UV system for immersion in a liquid. The system has a UV lamp unit mounted between upstream and downstream end retainers. The system also has a ring-shaped device mounted on the upstream end retainer adjacent the lamp unit.

DESCRIPTION OF THE DRAWING

FIG. 6b shows a cross sectional view of the channel of FIG. 6a.

DESCRIPTION OF THE PREFERRED EMBODIMENT(S)

Figure 1:
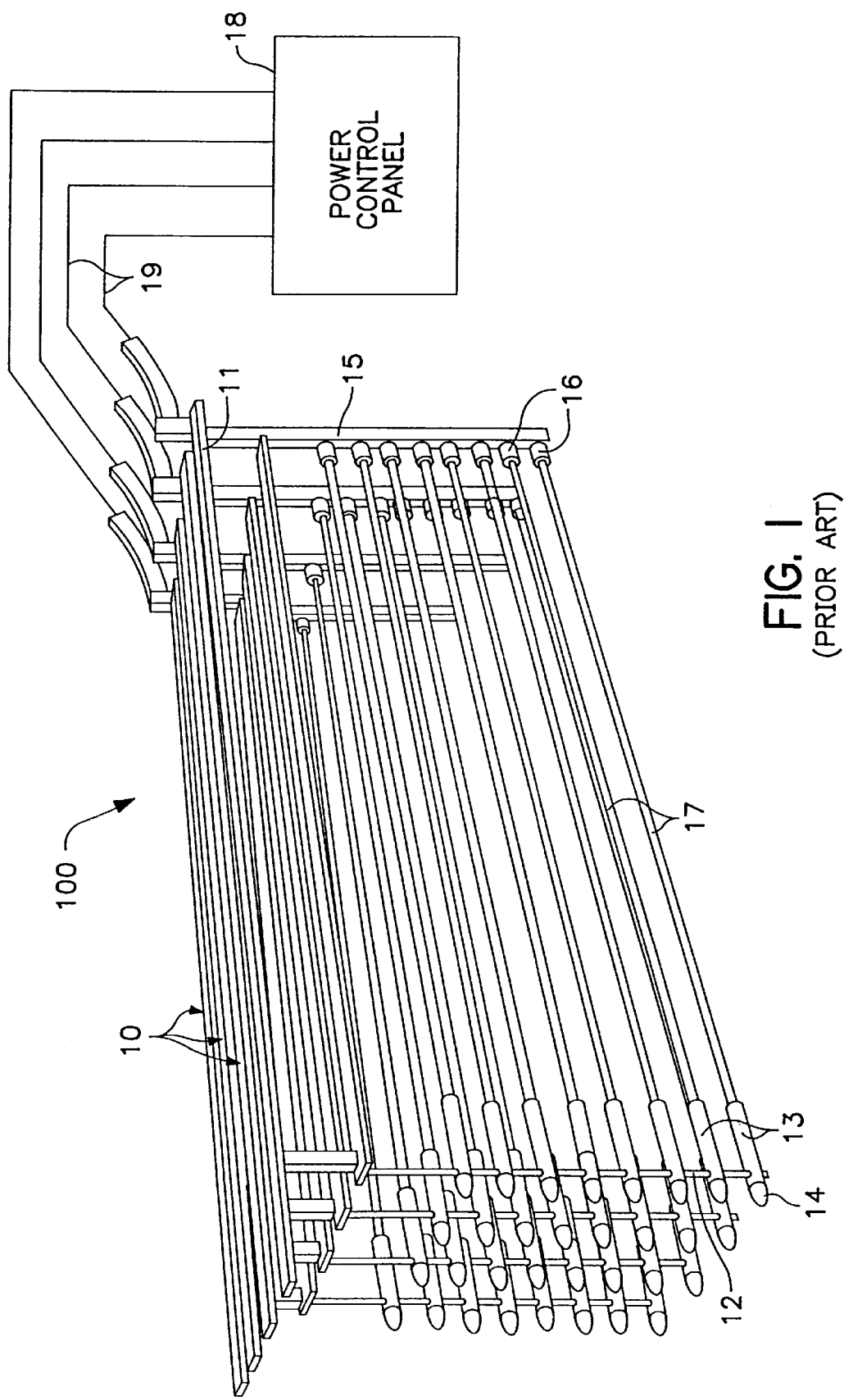
FIG. 1 shows a perspective of the UV system of the '256 Patent.

Referring now to FIG. 1, there is shown a perspective view of the UV system 100 described in the '256 Patent. The system 100 has one or more modular racks 10 each of which have a horizontal hangar bar 11. Depending from bar 11 at an upstream position is a vertical metal rod 12, and depending from bar 11 at a downstream position is a vertical metal conduit 15. Conduit 15 serves as a waterproof passage for electrical cables.

Pivotally mounted on rod 12 at equi-spaced points therealong are metal sleeves 13, each of which has a bullet shaped cap therein. Each of the sleeves swivels in a horizontal plane. Mounted on conduit 15 in a direction facing sleeves 13 are couplers 16, each housing a lamp socket.

Extending between sleeve 13 and the corresponding coupler 16 is a lamp unit 17. The upstream end of each lamp unit is slidably received in the associated sleeve and the downstream end is received in the associated coupler in a manner well known in the art.

Each lamp unit 17 comprises of an elongated tubular UV lamp. Each lamp is protectively housed in a quartz sleeve which is transparent to the UV radiation of the lamp. The upstream end of the quartz sleeve is closed. The open downstream end of the sleeve is received in coupler 16 in a manner so as to seal the open end. The electrical cables in conduit 15 pass through coupler 16 to thereby connect to each lamp at the open end of the associated sleeve.

Figure 2:
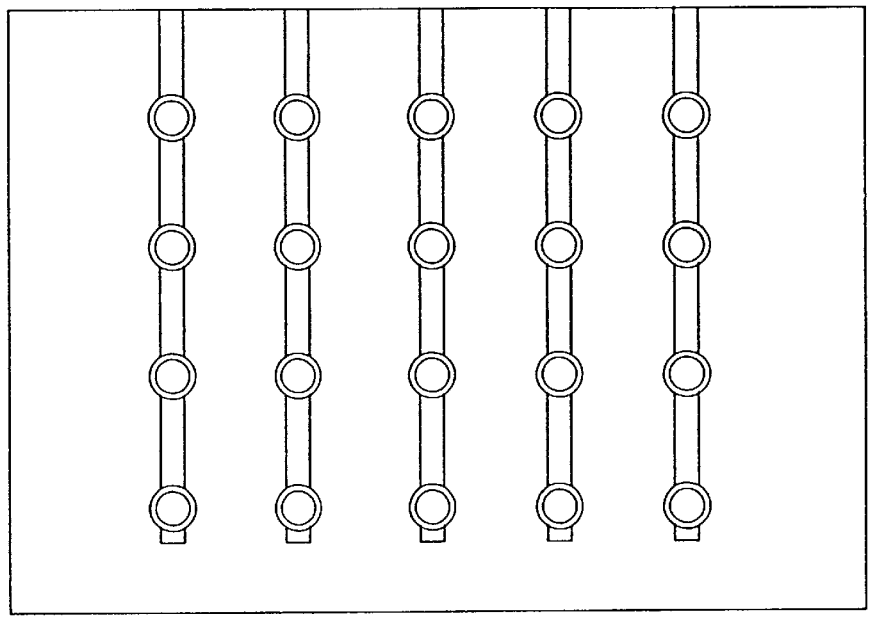
FIG. 2 shows an upstream end view of a flow channel in which a UV system having five racks is immersed.
Figure 3:
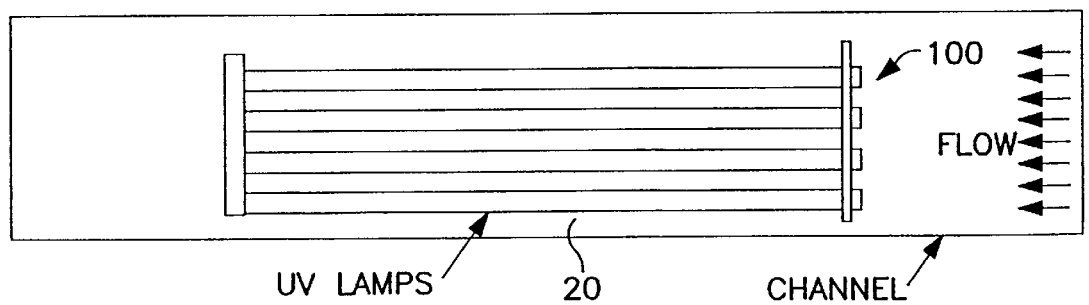
FIG. 3 shows a sectional side view of the channel shown in FIG. 2.

Referring now to FIG. 2, there is shown an upstream end view of a flow channel in which a system 100 having five racks 10 is immersed. Each rack has four lamp units extending between the associated one of sleeves 13 mounted on rod 12 and the associated downstream end coupler (not shown). FIG. 3 shows a sectional side view of the flow channel 20 with system 100 of FIG. 2 immersed therein.

Figure 4:
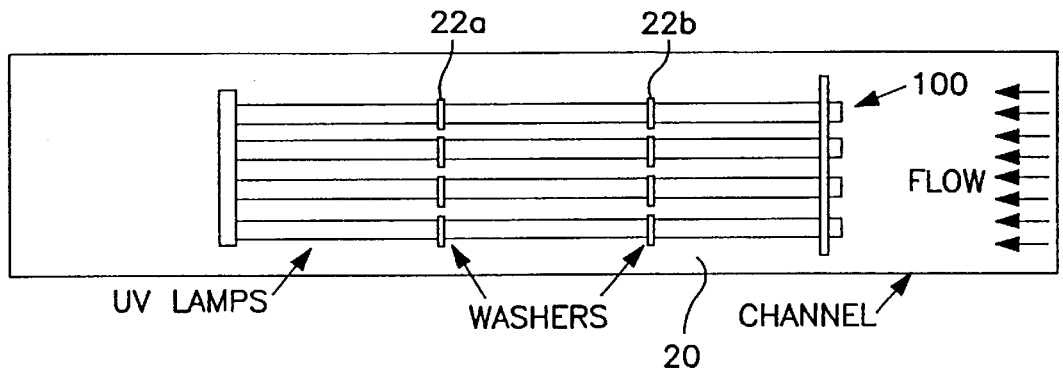
FIG. 4 shows a sectional side of the channel of FIG. 2 with a UV system embodied in accordance with one embodiment of the present invention immersed therein.

In order to increase the turbulent mixing of each rack 10 in system 100, ring-shaped devices, such as washers, were installed over the quartz sleeve in each lamp unit. In one embodiment, two washers of the same size were installed over each quartz sleeve. FIG. 4 shows a sectional side view of the flow channel 20 with the system 100 immersed therein and the two washers 22a and 22b installed on the quartz sleeve of each lamp unit in the rack.

One washer was installed at a point that is one-third of the distance from the upstream end of the rack to the downstream end. The other washer was installed at a point that is two-thirds of the distance from the upstream end to the downstream end. Each of the washers were held in place by a rubber ring (not shown) located right behind the washer. The washers may also be held in place by other means well known to those skilled in the art such as a metal piece which presses against but does not crack the quartz sleeve.

Figure 5:
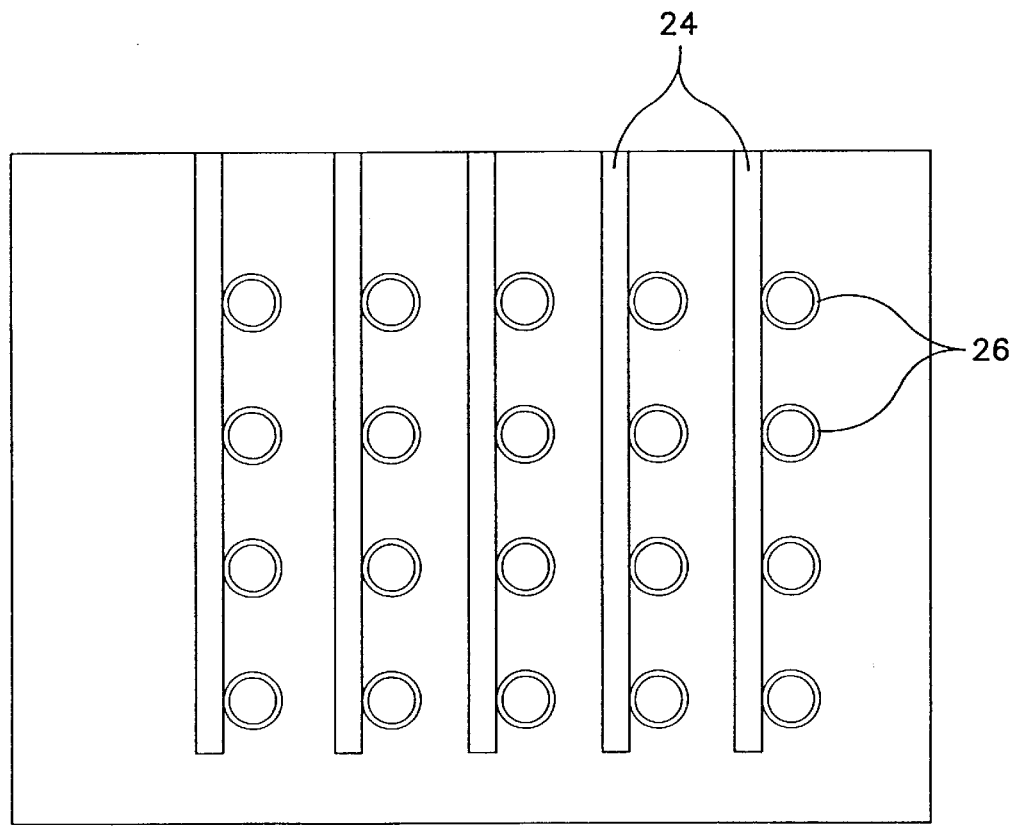
FIG. 5 shows an upstream end of a flow channel with a UV system embodied in accordance with another embodiment of the present invention immersed therein.

Referring now to FIG. 5, there is shown an upstream end view of a flow channel in which there is immersed another embodiment for each of the five racks in system 100.

In this embodiment, turbulent mixing is increased by rod 24 and rings 26 which replace rod 12 and metal sleeves 13 of the upstream end of the system described in the '256 Patent. The rings 26 were welded onto rod 24. The rings 26 hold the upstream end of each lamp unit.

Whereas each rack of the system described in the '256 patent employs quartz sleeves that are 1.61 m in length, each rack of the system of FIG. 5 employs quartz sleeves that are only 1.56 m in length. Therefore, not only does the system of FIG. 5 increase turbulent mixing it also results in a reduction of the length of, and thus the cost of, the quartz sleeve.

A further embodiment (not shown) for each of the five racks in system 100 increases turbulent mixing by combining the washers 22a, 22b of the embodiment shown in FIG. 4 with the rod 24 and rings 26 of the embodiment shown in FIG. 5.

The embodiments shown in FIGS. 4 and 5 and the embodiment which is the combination of those embodiments were each tested to determine the increase in turbulent mixing. The tests were performed by immersing each embodiment in a channel that measures 38.89 cm in width, 46 cm in depth and has an approximate length of 12 m. A neutrally buoyant red dye was injected into the flow so that video recordings could be made of the turbulent mixing and flow patterns. As is known to those skilled in the art, a neutrally buoyant dye is a dye that is at the same temperature as the water in the channel.

Figure 6A:
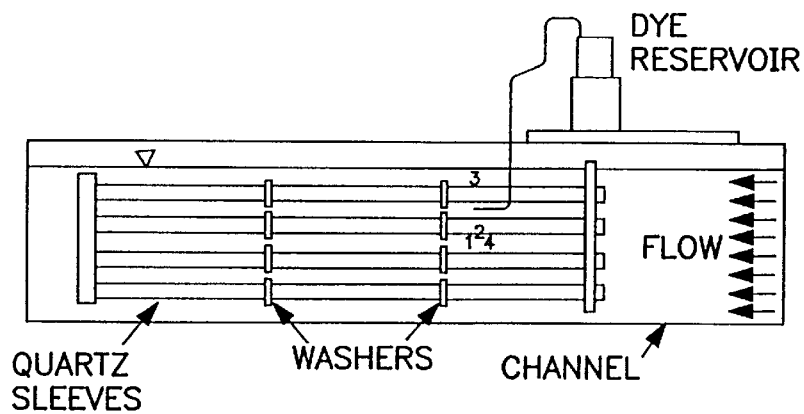
FIG. 6a shows a sectional side view of the channel used to test the present invention and the transverse locations where a neutrally buoyant dye was injected into the channel.
Figure 6B:
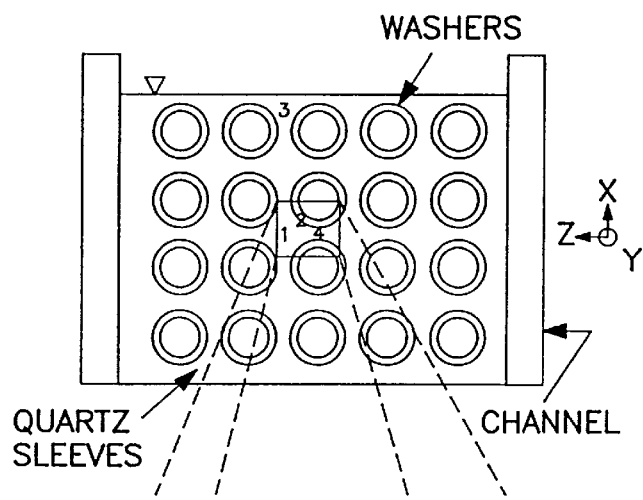
Figure 6C:
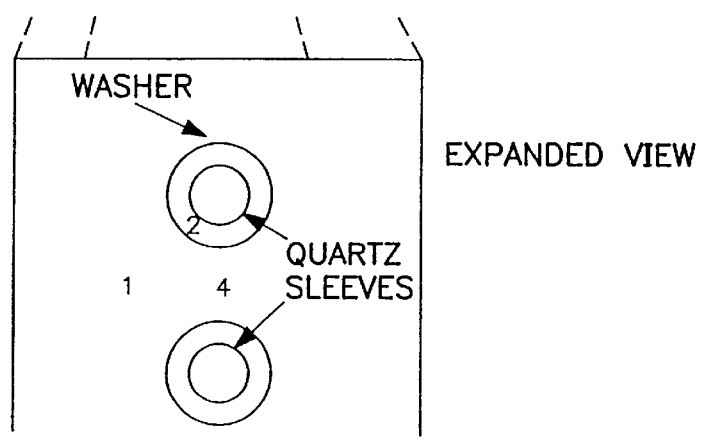
FIG. 6c shows a close up view of three of the dye injection points.

The red dye was injected into the channel at selected spots. FIG. 6a shows a side view of the channel and the four transverse positions 1–4 where the dye was injected. The axial location of the dye injection point was fixed at 5 cm upstream of each set of washers. FIG. 6b shows a cross sectional view of the channel and the dye injection points and FIG. 6c shows a close up view of dye injection points 1, 2 & 4.

In conjunction with the red dye described above, velocity measurements were also conducted on the racks. An acoustic doppler velocimeter (ADV) made by Sontek was used for these measurements. The ADV was held in place by a modified equatorial telescope mount. Since changes in water temperature produce corresponding changes in the speed of sound in water the temperature of the channel water was monitored using a mercury thermometer or other appropriate instrument.

Figure 7A:
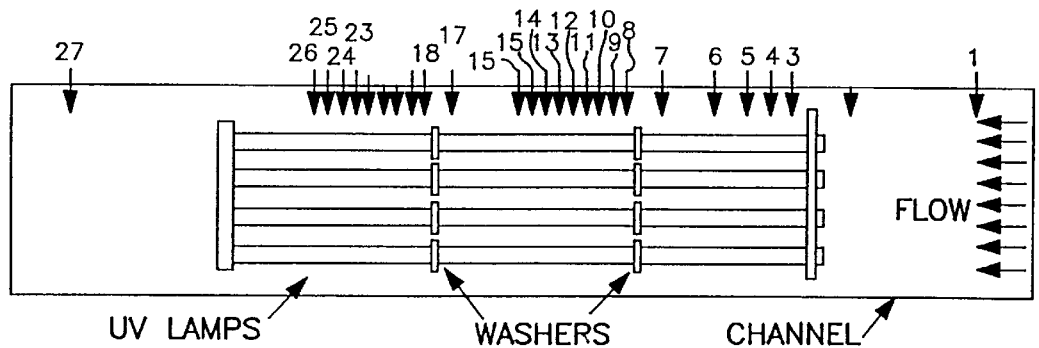
FIG. 7a shows a sectional side view of the channel used to test the embodiment of FIG. 4 and the axial locations where velocity measurements were made.

For the embodiment shown in FIG. 4, velocity measurements were sampled at the 27 axial locations identified by the numbers 1–27 shown in FIG. 7a. Twenty-four of the 27 axial locations are within the rack. For the embodiment shown in FIG. 5, velocity measurements were sampled at the twelve locations identified by the numbers 1–12 in FIG. 7b. Nine of the 12 axial locations are within the rack.

Figure 7B:
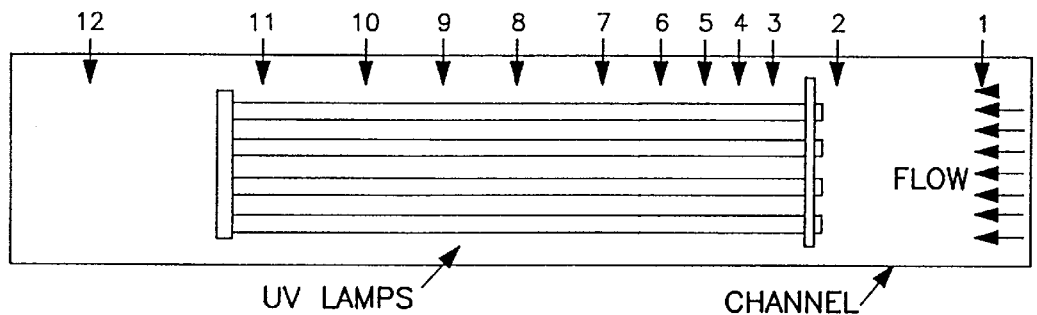
FIG. 7b shows a sectional side view of the channel used to test the embodiment of FIG. 5 and the axial locations where velocity measurements were made.
Figure 7C:
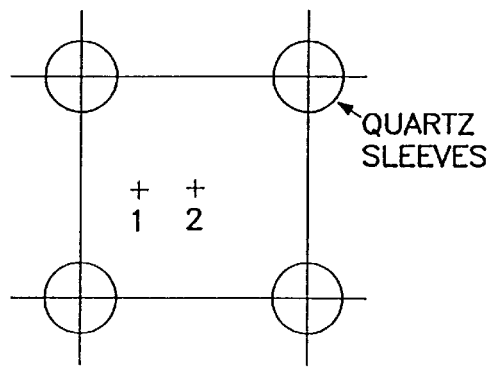
FIG. 7c shows the two transverse positions where velocity measurements were acquired for each axial location shown in FIGS. 7a and 7b.

At each axial location shown in FIGS. 7a and 7b the velocity measurements were acquired at the two transverse positions identified as 1 and 2 in FIG. 7c. Position 1 is midway between the centerline of adjacent vertical and horizontal lamps and position 2, where the UV intensity is at a minimum, is equidistant from the four quartz sleeves.

The testing showed that while the mixing at the upstream end of a rack with washers embodied as is shown in FIG. 4 is either equal to or slightly reduced as compared to a system with racks embodied as shown in the '256 Patent, there is a clear increase in mixing throughout the rest of the system. The testing also showed that the racks with washers embodied as is shown in FIG. 4 had increased average turbulence intensity values as compared to a system with racks embodied as shown in the '256 Patent. The testing further showed that the average turbulence intensity values increased as the washer size increased. The testing also further showed that the racks embodied as is shown in FIG. 5 also had increased average turbulence intensity values as compared to a system with racks embodied as shown in the '256 Patent.

The results described above for a system with racks embodied as shown in FIG. 4 are for that system wherein all of the washers in a system have the same diameter. That system was tested with all of the washers having one of five different washer diameters to account for differing flow velocities. Those washer diameters were 3.81 cm, 4.13 cm, 4.45 cm, 4.76 cm and 5.08 cm.

A system having racks embodied as shown in FIG. 4 was also tested wherein each rack had two washers of different diameters installed on the quartz sleeve of each lamp unit. One washer of 5.08 cm diameter was positioned one third the length of the rack downstream from the upstream entrance adjacent to rod 12. Another washer of 3.81 cm diameter was positioned two-thirds of the length of the rack downstream from the upstream entrance. That system also showed an increased average turbulence intensity values as compared to a system with racks embodied as shown in the '256 Patent.

The testing showed a slight decrease in residence time for those systems having racks embodied using the present invention as compared to the residence time in a system having racks embodied as shown in the '256 Patent. The increase in turbulence in all of the systems having racks embodied in accordance with the present invention is, however, quite large in comparison to the small decrease in residence time.

While the present invention has been described in connection with the system shown in the '256 Patent and the multiple racks having multiple lamp units described therein, it should be appreciated that turbulent mixing can be increased in a system consisting of a single lamp unit by using the rings of the present invention. It should further be appreciated that while the present invention has been described by an embodiment that has shown two rings mounted on each lamp unit and another embodiment which shows a single ring mounted on the upstream rod of the rack which holds the lamp unit, turbulent mixing may be increased by a single ring located either at the upstream or downstream of a lamp unit.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method of treating a fluid flowing in a canal, comprising the steps of:

disposing a plurality of vertically-extending support members in the canal;

coupling a plurality of radiation source assemblies to each of the plurality of vertically-extending support members, each radiation assembly being disposed with its longitudinal axis substantially parallel to a direction of fluid flow in the canal, each radiation assembly having an upstream end and a downstream end and a UV radiation lamp; and coupling a turbulence-increasing device to the upstream end of each of the plurality of radiation sources and outside a UV radiation zone of said UV radiation lamp, for causing fluid turbulence in the canal in the spaces between the plurality of radiation sources.

2. A method according to claim 1, wherein the step of coupling the turbulence-increasing device to the upstream end of each of the plurality of radiation sources causes sustained turbulence along a length of the plurality of radiation sources.

3. A method of ultraviolet water treatment of fluid flowing in a canal, comprising the steps of:

disposing a two-dimensional matrix array of ultraviolet radiation assemblies in the canal, each radiation assembly including an ultraviolet source and a sleeve surrounding said source, each ultraviolet source being disposed in the canal with its longitudinal axis substantially parallel to a direction of fluid flowing the canal;

disposing a plurality of turbulence-increasing members respectively connected to an upstream end of each said radiation source assembly, the plurality of turbulence-increasing members causing turbulent flow in the water in the canal between the plurality of sleeves; and disposing at least one of said plurality of turbulence-increasing members to cause the fluid to flow from the at least one turbulence-increasing member toward another radiation source assembly connected to another turbulence-increasing member.

4. A method according to claim 3, wherein the step of disposing the plurality of turbulence-increasing members causes sustained turbulence along a length of the plurality of radiation source assemblies.

* * * * *